United States Patent
Iwahashi et al.

(10) Patent No.: US 8,253,412 B2
(45) Date of Patent: Aug. 28, 2012

(54) ROTATION DETECTOR FOR A WHEELED VEHICLE

(75) Inventors: Masaru Iwahashi, Niigata (JP); Atsushi Kondo, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 469 days.

(21) Appl. No.: 11/992,796

(22) PCT Filed: Sep. 20, 2006

(86) PCT No.: PCT/JP2006/318569
§ 371 (c)(1),
(2), (4) Date: Mar. 28, 2008

(87) PCT Pub. No.: WO2007/040044
PCT Pub. Date: Apr. 12, 2007

(65) Prior Publication Data
US 2009/0146648 A1    Jun. 11, 2009

(30) Foreign Application Priority Data

Sep. 30, 2005 (JP) ................................. 2005-287665
Dec. 2, 2005 (JP) ................................. 2005-349454

(51) Int. Cl.
*G01B 7/30* (2006.01)
(52) U.S. Cl. ................. 324/207.25; 324/174; 73/514.39
(58) Field of Classification Search ............ 324/207.25, 324/174
See application file for complete search history.

(56) References Cited

U.S. PATENT DOCUMENTS 4,331,394 A * 5/1982 Girard ........................... 351/158
(Continued)

FOREIGN PATENT DOCUMENTS

| JP | 2-264817 | 10/1990 |
| JP | 9-229714 | 9/1997 |
| JP | 10-331322 | 12/1998 |
| JP | 2000-249715 | 9/2000 |
| JP | 2004-52848 | 2/2004 |

OTHER PUBLICATIONS

English machine translation of the claims and detailed description of JP 2000-249715 A, obtained on Apr. 30, 2010.*

(Continued)

*Primary Examiner* — Jay Patidar
*Assistant Examiner* — David M. Schindler
(74) *Attorney, Agent, or Firm* — McDermott Will & Emery LLP

(57) ABSTRACT

A rotation detector that can be assembled into a hub of a wheel without breakage of an object to be detected. The rotation detector has a housing (1) having an insertion section (1a) in which an axle (S) is inserted and that is placed between a hub (10a) of a front wheel (10) and a front fork, a magnet (3a) placed in the housing (1) and generating a magnetic field, and a magnetism detection element (3) provided in the housing (1) so as to be able to detect a change in the magnetic field and detecting the change in the magnetic field involved in the rotation of the object (5) to be detected. The object (5) to be detected is formed of a different magnetic material from the hub (10a) and has a portion (5a) to be detected that rotates in synchronous with the hub (10a).

5 Claims, 2 Drawing Sheets

U.S. PATENT DOCUMENTS

| | | | |
|---|---|---|---|
| 5,880,585 | A | 3/1999 | Oguro |
| 6,703,826 | B2 * | 3/2004 | Oguro .......................... 324/174 |
| 6,903,545 | B2 * | 6/2005 | Oguro ....................... 324/207.22 |
| 6,958,601 | B1 * | 10/2005 | Su et al. ................... 324/207.25 |
| RE39,843 | E * | 9/2007 | Wineland ................. 324/207.25 |
| 2005/0275561 | A1 * | 12/2005 | Kolda et al. .............. 340/870.07 |

OTHER PUBLICATIONS

Microfilm of the specification and drawings annexed to the request of Japanese Utility Model Application No. 45953/1980 (Laid-open No. 146256/1981), Nov. 4, 1981.

* cited by examiner

ROTATION DETECTOR FOR A WHEELED VEHICLE

RELATED APPLICATIONS

This application is the U.S. National Phase under 35 U.S.C. §371 of International Application No. PCT/JP2006/318569, filed on Sep. 20, 2006, which in turn claims the benefit of Japanese Application No. 2005-287665, filed on Sep. 30, 2005 and Japanese Application No. 2005-349454, filed on Dec. 2, 2005, the disclosures of which Applications are incorporated by reference herein.

TECHNICAL FIELD

The present invention relates to a rotation detector, a rotation detector for a two-wheeled vehicle such as a motorcycle and a bicycle, for example.

BACKGROUND ART

A rotation detector has been disclosed in Patent Reference 1. In the rotation detector, a magnetic detection element, which is formed from a Hall IC or the like mounted on a circuit board, and a magnet are provided in a substantially cylindrical resin case, which has a detection surface for detecting an object to be detected, along the detection surface. In the rotation detector, it is arranged that the circuit board, the magnetism detection element and the magnet are sealed with a seal member formed of epoxy and such. In the case of using such a rotation detector as a rotation detector for a two-wheeled vehicle (a motorcycle, for example), the rotation detector is generally mounted to a mission case, a sprocket cover or the like of the vehicle to detect a mission gear, a sprocket or the like, which rotates inside the mission case, the sprocket cover or the like, as an object to be detected.

In the case that such a rotation detector is used for detecting the mission gear, the sprocket or the like as an object to be detected, the object to be detected has more or less clearance. This causes vibration of the object to be detected due to body rigidity, exhaust gas volume or the like of a vehicle (the two-wheeled vehicle), so that a gap in position of detection between the object to be detected and the rotation detector varies. This causes a change in magnetism of the rotation detector to cause a detection noise. Accordingly, there is a problem that the noise causes an error in operation of an indicator for displaying a speed, for example, in accordance to output data outputted from the rotation detector. In view of the problem, the applicant has proposed a rotation detector disclosed in Patent Reference 2.

The rotation detector is to be mounted to a front wheel (a wheel) of a two-wheeled vehicle such as a motorcycle. The rotation detector comprises a housing having an insertion section in which an axle is inserted, the axle to which the front wheel is mounted, and has plural magnetic poles, which rotate together with the front wheel, in the insertion section. An object to be detected, which is formed from a magnetic medium such as a plastic magnet, is mounted to the rotation detector. The rotation detector is arranged so that a magnetism detecting means formed from a Hall IC and such would detect a change of the magnetic pole due to rotation of the object to be detected.

The object to be detected is formed from a cylindrical part having the magnetic pole and a rotation transmitting piece for transmitting rotation of the front wheel to the cylindrical part, the cylindrical part and the rotation transmitting piece being formed into one body from a plastic magnet and such. The rotation transmitting piece is led out from the cylindrical part on an opening part side of the housing outward to be formed so as to correspond to a concave-shaped mounting part provided in a hub of the front wheel. The rotation transmitting piece is provided in plural places of a circumferential edge of the cylindrical part.

The rotation detector having such a structure is provided so as to be held between the front wheel and a front fork. That is to say, the rotation detector is provided so as to be held between (fastened to) the front wheel and a front fork by inserting in the insertion section the axle to which the front wheel is mounted, by fitting the rotation transmitting piece into the mounting part provided in the hub of the front wheel and by fixing the axle projecting toward the outer side of the housing from the insertion section with a nut member through the front fork.

Patent Reference 1: JP 2-264817 A
Patent Reference 2: JP 9-229714 A

DISCLOSURE OF THE INVENTION

Problems to be Solved by the Invention

In the case of mounting such a rotation detector to the hub, only the object to be detected rotates while the rotation transmitting piece is not fitted into the mounting part in fitting the rotation transmitting piece of the rotation detector into the mounting part of the hub, in some cases, since the object to be detected is inserted into the insertion section of the housing so as to be freely rotatable. Further, it is difficult to visually confirm whether the rotation transmitting piece is fitted into the mounting part or not. This leads to a problem that fastening the rotation detector to and between the hub and the front fork in such an improper state that the rotation transmitting piece is not fitted into the mounting part is likely to cause damage to the rotation transmitting piece formed from the plastic magnet.

The invention addresses the problem described above. The invention is to provide a rotation detector that can be assembled into a hub of a wheel without breakage of an object to be detected.

Means for Solving the Problems

The invention is a rotation detector comprising at least: a housing mounted through an axle arranged between the hub of the wheel and the front fork of a two-wheel vehicle; a magnet provided on the inside of the housing to generate a magnetic field; and a magnetic detection device provided in the housing in a state capable of detecting a change of the magnetic field caused by a rotation of an object to be detected, the rotation detector characterized in that the object to be detected is formed from a magnetic material that is different from the hub and arranged to have at least a part to be detected which rotates synchronously to the hub.

Further, the invention is characterized in that the object to be detected comprises: a support part for supporting the portion to be detected provided with a hole part for inserting the insertion section; and a rotation transmitting part for transmitting rotations of the hub to the support part.

Moreover, the invention is characterized in that the supporting part is provided with a concave part that is used for the rotation transmitting part to be fitted to a projecting part provided in the hub.

Furthermore, the invention is characterized in that the concave part is provided with a pair of protrusion parts to hold and fix the projecting part.

In addition, the invention is characterized in that a convex part that is used as the rotation transmitting part fixed to a concave arrangement part in the hub is provided.

Moreover, the invention is characterized in that the housing is arranged so that the object to be detected would approach the magnetic detection device and so that the housing is provided with a housing part to rotatably store the part to be detected.

Effect of the Invention

The invention is a rotation detector comprising at least: a housing mounted through an axle arranged between the hub of the wheel and the front fork of a two-wheel vehicle; a magnet provided on the inside of the housing to generate a magnetic field; and a magnetic detection device provided in the housing in a state capable of detecting a change of the magnetic field caused by a rotation of an object to be detected, the rotation detector characterized in that the object to be detected is formed from a magnetic material that is different from the hub and arranged to have at least a part to be detected which rotates synchronously to the hub. This allows the rotation detector to be assembled into a hub of a wheel without breakage of an object to be detected.

DESCRIPTION OF SIGNS AND NUMERALS

Figure 1:
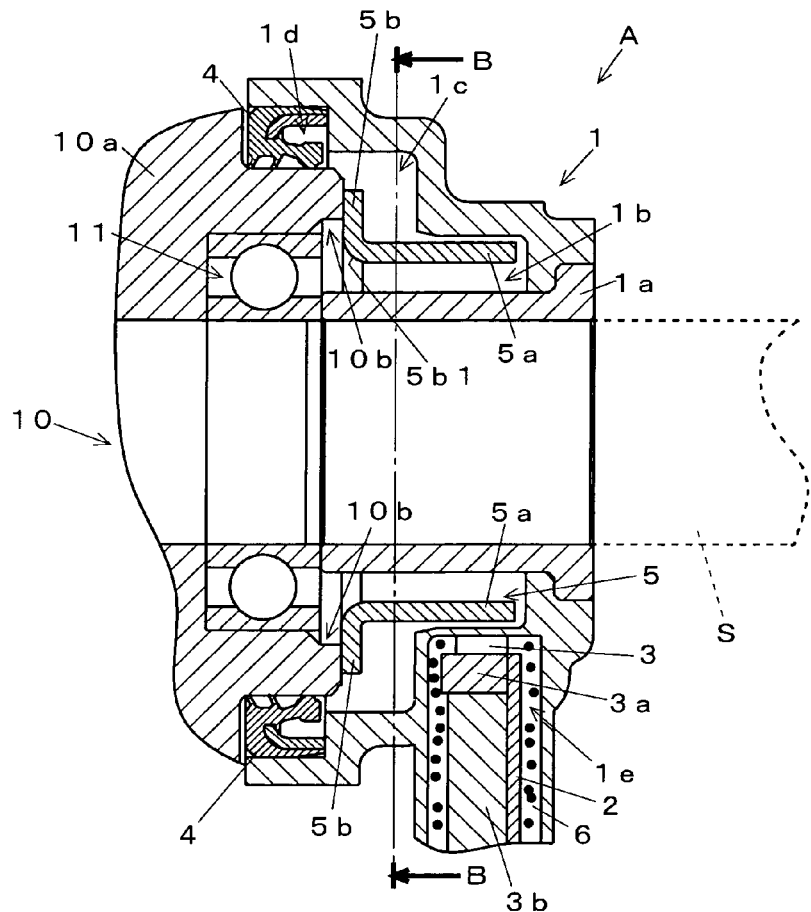
FIG. 1 is a sectional view of an integral part of a rotation detector in accordance with an embodiment of the invention.

A rotation detector
1 housing
1a insertion section
1b first housing part (housing part)
1c second housing part
1d third housing part
1e fourth housing part
2 circuit board
3 magnetic detection element (magnetic detection device)
4 sealing member
5 object to be detected
5a portion to be detected
5b base part (support part)
5b1 hole part
5c concave part (rotation transmitting part)
5d protrusion part
10 front wheel (wheel)
10a hub
10b cylindrical part
10c projecting part
S axle

BEST MODE FOR CARRYING OUT THE INVENTION

The present invention is described hereinafter with reference to the drawings applied to an electric rotation detector for detecting the number of rotations of a wheel of a motorcycle (for example, a two-wheeled vehicle).

Figure 2:
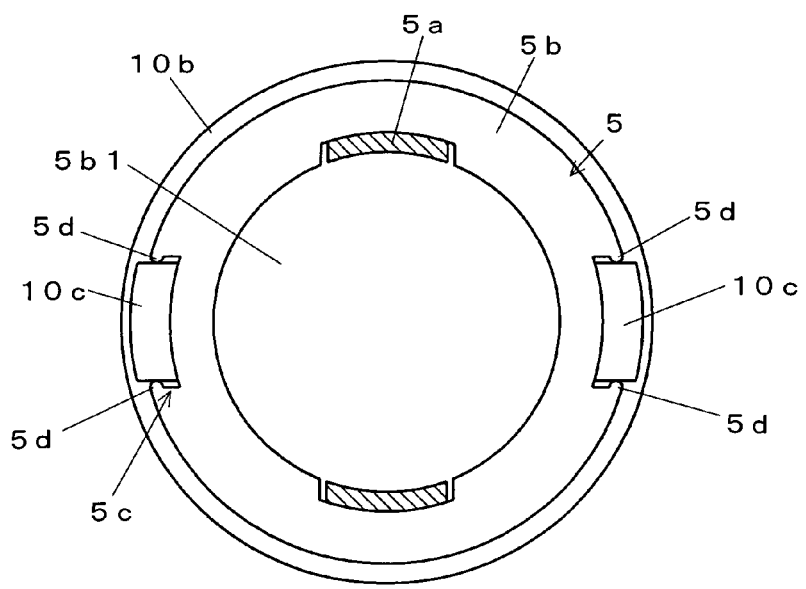
FIG. 2 is a sectional view taken along a line B-B in FIG. 1.
Figure 3:
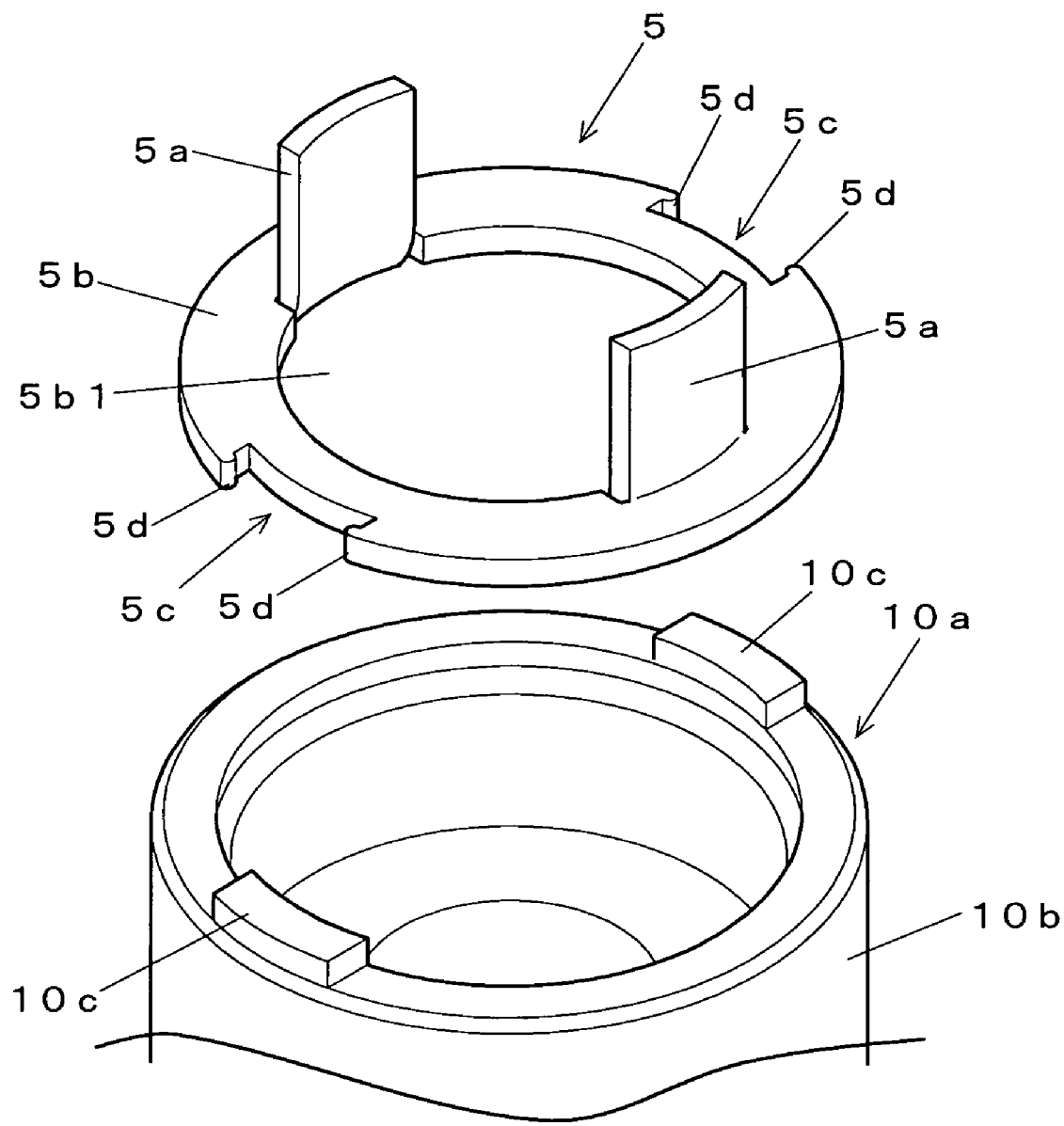
FIG. 3 is a perspective view of an object to be detected and a hub in accordance with the embodiment.

In FIGS. 1 to 3, a rotation detector A is formed from a housing 1, a circuit board 2, a magnetic detection element (a magnetic detection device) 3, a sealing member 4 and an object to be detected 5.

The housing 1 is formed from a resin material such as polybutylene terephthalate and polyamide. An axle S to which a front wheel (a wheel) of a two-wheeled vehicle is mounted is inserted into the substantial center of the housing 1. A substantially cylindrical insertion section 1a formed from a metallic material is formed in insert-molding. On a circumferential edge of the insertion section 1a, there is a first housing part (a housing part) 1b for providing (housing) a part to be detected 5a of the object to be detected 5, which is described later in detail, in an outer circumference of the insertion section 1a so as to be freely rotatable. A second housing part 1c in which a fixing part 5c of the object to be detected 5, the fixing part 5c being described later in detail, that is capable of rotating, is formed in a position connected to the first housing part 1b through a step part. In a position connected to the second housing part 1c through a step part, formed is a third housing part 1d for providing the sealing member 4 described later in detail. Further, a fourth housing part 1e is provided on one side of the first housing part 1b for housing the circuit board 2, the magnetic detection element 3 mounted to the circuit board 2, a magnet 3a generating a magnetic field and a holder 3b. The insertion section 1a may be a synthetic resin material formed of polyphenylene sulfide (PPS) other than a metallic material.

The circuit board 2 is formed from an insulating material such as glass epoxy with a predetermined wiring pattern on a substrate. Electric components such as the magnetic detection element 3 and capacitor and the like (not shown) are electrically fixed to the circuit board 2 by soldering or the like. Further, the circuit board 2 is provided with the holder 3b holding the magnet 3a located behind the magnetic detection element 3. The circuit board 2 comprises a wiring code (not shown) for supplying the magnetic detection element 3 with power and for transmitting an output signal from the magnetic detection element 3 to an indicator (a speed meter, for example) not shown. The wiring code is electrically connected to a predetermined place of the circuit board 2 by soldering. The circuit board 2 is provided in the fourth housing part 1e, which is filled up with a seal member 6 formed from epoxy resin and such, for the purpose of fixing the circuit board 2 in the fourth housing part 1e.

The magnetic detection element 3 is formed from a Hall IC, an MR element (a semiconductor magnetic resistance element) and the like. The magnetic detection element 3 detects the change of a magnetic field occurring in accordance with movement (rotation) of the object to be detected 5.

A sealing member 4 is formed from a rubber material such as nitrile and silicone into the thin annular shape. The external shape of the sealing member 4 is formed slightly bigger than in the size than the side wall of the third housing part 1d of the housing so that the sealing member 4 is provided into the third housing part 1d by press-fitting. This causes the sealing member 4 to be fixedly provided into the third housing part 1d by pressure. Accordingly, when the rotation detector A is provided in a hub 10a (a mounting part) of a front wheel 10 which is formed of aluminum, an external surface of a cylindrical part 10b of the hub 10a comes into contact with an internal surface of the sealing member 4 and this sealing prevents dust, dirt or moisture from entering the inside of the housing 1.

At an end surface of the cylindrical part 10b of the hub 10a, the hub 10a comprises a projecting part 10c at a position symmetrical with respect to a rotation center of the hub 10a. A cross section of the projecting part 10c in a direction vertical to a rotation axis of the hub 10a is arranged to be in the shape of an arc. In a space inside the cylindrical part 10b of the hub 10a, a ball bearing 11 is provided as bearings.

The object to be detected 5 is formed from a magnetic material having magnetism, a metallic material such as iron, for example. The object to be detected 5 comprises parts to be detected 5a, which are located on a circumference of the insertion section 1a of the housing 1 so as to be separated from each other and which are formed from plate-shaped projecting pieces whose cross sections are in the shape of an arc. The object to be detected 5 comprises a support part (a base part) 5b in the shape of a substantially annular plate for supporting the part to be detected 5a on a lower edge side of the part to be detected 5a. At a substantially center part of the base part 5b, formed is a hole part 5b1 is formed in which the axle S and the insertion section 1a are inserted. In the case of the embodiment, the object to be detected 5 is formed from the part to be detected 5a and the base part 5b, which are formed into one body, and the part to be detected 5a is provided closely to the magnetic detection element 3. It is preferable to set a distance between the part to be detected 5a and the magnetic detection element 3 at 5 mm or less, for example. Two pieces of the part to be detected 5a are provided for the purpose of generating two pulses for a rotation of the hub 10a in the embodiment. Four pieces of the part to be detected 5a are provided in the case of generating four pulses for a rotation of the hub 10a. The part to be detected 5a may be provided into "n" in number in the case that "n" pulses are generated for a rotation of the hub 10a.

Moreover, the base part 5b is provided with a concave part 5c fixed to the projecting part 10c formed at the end of the cylindrical part 10b of the hub 10a of the front wheel 10. The concave part 5c has a function as a rotation transmission part for transmitting rotation of the hub 10a to the base part 5b. The concave part 5c is a notch almost as large as the projecting part 10c of the hub 10a and the notch is formed on the outer circumferential part of the base part 5b. On the relative side to the notch, a protrusion part 5d, which is a convex part protruding so as to be in contact with a side surface of the projecting part 10c is provided. By holding the projecting part 10c between a pair of the protrusion parts 5d, the object to be detected 5 is fixed to the hub 10a and the part to be detected 5a is rotated synchronously to the rotation of the hub 10a. The object to be detected 5 is firmly fixed to the hub 10a so that it is not easily disengaged from the hub 10a. The concave part 5c of the part to be detected 5a is pushed (pressured) to the projecting part 10c with pressure for the purpose of fixing the part to be detected 5a to the hub 10a.

The contact of a pair of protrusion parts 5d provided on an inner surface of the concave part 5c with surfaces of the projecting part 10c in a direction of rotation of the hub 10a allows the object to be detected 5 to be fixed to the hub 10a in the embodiment. The invention, however, is not limited to the embodiment. At least one protrusion part 5d may be provided on a bottom surface of the concave 5c so as to fix the object to be detected 5 to the hub 10a with pressure, for example.

In assembling the rotation detector A and the hub 10a, the concave part 5c of the object to be detected 5 is positioned and fixed to the projecting part 10c provided at the end of the hub 10a so as not to be moved in the rotation direction of the hub 10a. The housing 1 of the rotation detector A is then mounted to the cylindrical part 10b of the hub 10a with the sealing member 4 being bent. The hub 1a and a front fork not shown are used to hold the housing 1 therebetween, at last.

The respective parts described above are used to form the rotation detector A.

The rotation detector A comprises a housing 1 mounted through an axle arranged between the hub of the wheel and the front fork of a two-wheel vehicle, the magnet 3a for generating the magnetic field provided on the inside of the housing 1 and the magnetic detection device for detecting a change of the magnetic field, the change caused by a rotation of an object to be detected 5. The object to be detected 5 is formed from a magnetic material that is different from the hub 10a and provided with the part to be detected 5a which rotates synchronously with the hub 10a. Accordingly, the metallic material, which is a magnetic material, is used to form the object to be detected 5. This protects the object to be detected 5 from being damaged even in the case that an error occurs in mounting the rotation detector A to the hub 10a.

Furthermore, in the embodiment, the object to be detected 5 comprises a base part 5b provided with a hole part 5b1 into which the insertion section 1a is inserted for supporting the part to be detected 5a and a concave part 5c, which is a rotation transmission part for transmitting rotation of the hub 10a to the base part 5b. The concave part 5c is fitted and fixed to the projecting part 10c provided in the hub 10a. This allows the object to be detected 5 to be easily fixed to the hub 10a. Further, due to the improvement of stability in mounting the object to be detected 5 to the hub 10a, it is possible to provide a rotation detector excellent in detection precision by means of the magnetic detection element 3.

In addition, providing a pair of the protrusion parts 5d for holding and fixing the projecting part 10c of the hub 10a in the concave part 5c allows the object to be detected 5 to be mounted to the hub 10a without chatter in the embodiment. This causes an increase in stability in mounting the object to be detected 5 to the hub 10a and thereby, it is possible to provide a rotation detector increased in detection precision by means of the magnetic detection element 3.

Moreover, in the embodiment, the housing 1 is arranged so that the part to be detected 5a would approach the magnetic detection element 3 and so as to comprise the first housing part 1b for rotatably housing the part to be detected 5a. This allows the precision in detection by means of the magnetic detection element 3 to be increased.

Further, in the embodiment, the concave part 5c is provided on the base part 5b of the project to be detected 5 and a pair of the protrusions 5d is provided in the concave part 5c so that the projecting part 10c of the hub 10a would be held between the pair of protrusion parts 5d for the purpose of fitting and fixing the object to be detected 5 to the hub 10a. It is possible, however, that the base part 5b, the concave part 5c and the protrusion part 5d are removed, for example, to form the object to be detected 5 only from the part to be detected 5a that is formed from a plate-shaped projection piece and a lower end part of the part to be detected 5a is pressured and fixed to the concave groove part formed at an end of the cylindrical part 10b of the hub 10a. Moreover, a screw having a top part in the shape of a substantially circular plate or a magnetic body in the shape of a pin (a column-shaped bar member), for example, may be also applied to the part to be detected 5a other than the plate-shaped projecting piece. A lower end part of the magnetic body may be pressured and fixed into the groove part in this case. Forming the object to be detected 5 only from the part to be detected 5a as described above causes a structure of the object to be detected 5 to be simplified, and therefore, allows an inexpensive rotation detector to be provided.

Additionally, in the embodiment, described is a case that a pair of the concave parts 5c is provided in the base part 5b of the object to be detected 5 while a pair of the protrusion parts 5d in the respective concave parts 5c and two projecting parts 10c which are formed at an end of the cylindrical part 10b of the hub 10a correspondingly to the respective concave parts 5c are respectively held between the pairs of protrusion parts 5d so that the object to be detected 5 would be fitted and fixed to the hub 10*a*. It is possible, however, that a pair of concave arrangement parts are formed at an end of the cylindrical part 10*b* while a pair of protrusion parts are provided respectively in the respective arrangement parts, for example, and two convex parts, which are rotation transmitting parts formed projectingly toward the hub 10*a* of the base part 5*b* so as to correspond to the respective arrangement parts, are held between the pairs of protrusion parts for the purpose of fitting and fixing the object to be detected 5 to the hub 10*a*. In this case, it is also possible to remove the pairs of protrusion parts and to pressure and fix the respective convex parts provided behind the base part 5*b* to the respective concave arrangement parts provided at the end of the cylindrical part 10*b*.

The wiring pattern is mounted to the circuit board 2 in the embodiment. It may be possible, however, to form a three-dimensional conductive circuit in the housing 1, which is a resin mold, other than the circuit board 2, for example, to form the housing 1 as a three-dimensional injection-molded circuit component. Such a structure requires no circuit board, so that a lower-priced rotation detector can be provided.

INDUSTRIAL APPLICABILITY

The invention is applied to a rotation detector for detecting rotation of a wheel of a two-wheeled vehicle.

The invention claimed is:

1. A rotation detector comprising at least:
   a housing through which an axle is inserted, said housing arranged between a hub of a wheel and a front fork of a two-wheel vehicle;
   a magnet provided on the inside of the housing for generating a magnetic field; and
   a magnetic detection device provided in the housing in a state capable of detecting a change of the magnetic field, the change being in accordance with a rotation of an object to be detected,
   the rotation detector characterized in that the object to be detected is formed from a magnetic material, wherein said magnetic material is different from a material of the hub and arranged to have at least a part to be detected, the part being rotated synchronously to the hub,
   wherein:
   the object to be detected comprises a support part comprising a concave part,
   the hub is provided with a projecting part, and
   the concave part is provided with a pair of inwardly facing protrusion parts protruded towards each other, and
   the pair of inwardly facing protrusion parts protruded towards each other hold and fix the projecting part.

2. The rotation detector according to claim 1, wherein the support part is provided with a hole part into which an insertion part is inserted.

3. The rotation detector according to claim 2, characterized in that the concave part is configured to transmit the rotation of the hub to the support part.

4. The rotation detector according to claim 3, wherein the protrusion parts of the concave part transmit the rotation of the hub to the support part.

5. The rotation detector according to claim 1, characterized in that the housing is configured to allow the object to be detected to rotate within the housing and approach the magnetic detection device.

* * * * *